(12) United States Patent
Warren

(10) Patent No.: US 8,265,905 B2
(45) Date of Patent: *Sep. 11, 2012

(54) AUTOMATED BENCHMARKING OF SOFTWARE PERFORMANCE

(75) Inventor: Christina E. Warren, San Jose, CA (US)

(73) Assignee: Apple Inc., Cupertino, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/460,994

(22) Filed: Jul. 27, 2009

(65) Prior Publication Data

US 2010/0030524 A1 Feb. 4, 2010

Related U.S. Application Data

(63) Continuation of application No. 10/966,085, filed on Oct. 15, 2004, now Pat. No. 7,603,257.

(51) Int. Cl.
G06F 11/30 (2006.01)

(52) U.S. Cl. .................................................. 702/186

(58) Field of Classification Search .............. 702/68, 702/79, 80, 123, 176, 184, 186; 705/10, 705/36 R; 707/201; 715/771
See application file for complete search history.

(56) References Cited

U.S. PATENT DOCUMENTS

| 6,123,733 | A  | * | 9/2000  | Dalton .............................. 703/5 |
| 6,754,612 | B1 |   | 6/2004  | Vanfladern et al. |
| 7,603,257 | B1 |   | 10/2009 | Warren |
| 2003/0065605 | A1 | * | 4/2003 | Gatto .............................. 705/36 |
| 2005/0086612 | A1 | * | 4/2005 | Gettman et al. .............. 715/848 |
| 2005/0108653 | A1 | * | 5/2005 | Langridge ..................... 715/771 |

OTHER PUBLICATIONS

Portions of prosecution history of U.S. Appl. No. 10/966,085, filed Jul. 6, 2009, Warren, Christina E.

* cited by examiner

Primary Examiner — Mohamed Charioui
(74) Attorney, Agent, or Firm — Adeli & Tollen LLP

(57) ABSTRACT

Methods for automated benchmarking of views of one or more windows of an application. The methods analyzes content of a window to benchmark views in the window automatically once a target application and/or target window have been specified for benchmarking by a user. Benchmarking is performed without requiring the addition or modification of any code in the target application. Views of a window may be analyzed directly through the window or through a view list or view hierarchy associated with the window. In some embodiments, views of a window are benchmarked through the application that creates the window. In some embodiments, a window is benchmarked directly through a resource file that defines the window without use of an application. In some embodiments, the method benchmarks one or more commands of a data file. In some embodiments, one or more introspectable objects in a collection is automatically benchmarked.

15 Claims, 12 Drawing Sheets

AUTOMATED BENCHMARKING OF SOFTWARE PERFORMANCE

This Application is a continuation application of U.S. patent application 10/966,085, filed Oct. 15, 2004, now issued as U.S. Pat. No. 7,603,257, which is incorporated herein by reference.

FIELD OF THE INVENTION

The present invention concerns the field of automated benchmarking of software performance.

BACKGROUND OF THE INVENTION

Benchmarking is used to measure the performance of computer hardware and/or software. Benchmark measurements can be used for a range of purposes, for example, to test how fast a particular hardware or software program works in comparison to another hardware or software program, or to test performance of a particular hardware or software program after a modification has been made to the hardware or software program. A basic benchmark measurement for a particular computer hardware and/or software is the time required to perform a particular operation/function. However, benchmark measurements may be expressed in other ways, such as the operations per second performed, etc.

Benchmarking is often performed on views (e.g., controls) in a window of an application that runs in a graphical user interface (GUI) environment. For example, a control view of an application window has an associated operation/function that can be benchmarked, the associated operation/function being performed when the control is selected/activated. To test controls of an application, several approaches have been used. A user may manually activate a control and measure the time required to perform the operation associated with the control. This method, however, is time consuming and prone to substantial error.

Alternatively, a user may create a scripted benchmark by 1) creating a script to perform a specific operation for a specific application and 2) creating a script to benchmark the specific operation for the specific application. However, testing views of applications in this manner is time consuming and difficult since it requires the user to create specific scripts for each operation of an application to be tested. The user must then create specific scripts for each operation of each different application to be tested.

As a further alternative, a user can create code within an application to perform a specific operation and benchmark the specific operation. However, testing controls of applications in this manner is also time consuming and difficult since it requires the user to create specific code for each operation to be tested within an application. The user must then create specific code for each operation in each different application to be tested.

As such, there is a need for a method for benchmarking views of windows of an application in an easy and efficient manner.

SUMMARY OF THE INVENTION

Some embodiments of the present invention relate to automated benchmarking of views of one or more target windows of a target application. The method analyzes the content of a target window to identify and benchmark views in the window. Views of a window may be analyzed directly through the window or through a view list or view hierarchy associated with the window. A view of a window is benchmarked by an appropriate scenario function that is designed to test a specific type of view. Each view in the set of views has one or more associated operations that can be benchmarked. As such, a set of views has an associated set of operations that are benchmarked by a set of scenario functions where a particular scenario function may benchmark one or more operations associated with a single view and/or benchmark one or more views of a window. Further, a scenario function can benchmark one or more windows of a single application. Through use of the set of scenario functions, the method benchmarks views of a window automatically (without human intervention) once a target application and/or target window have been specified for benchmarking by a user.

In some embodiments, views of a window are benchmarked through the application that creates the window. In other embodiments, a window is benchmarked directly through a resource file that defines the window without use of an application. In these embodiments, a command line tool can be used to benchmark operations across different applications. In some embodiments, the method benchmarks the performance of one or more commands of a data file.

In some embodiments, a collection of introspectable objects is automatically benchmarked. The method analyzes objects in the collection to determine attributes of the object. Based on the attributes of an object, the method determines whether the object is a corresponding benchmarkable object and, if so, benchmarks the object. Through use of a set of scenario functions, the method benchmarks objects of the collection automatically (without human intervention) once a target collection has been specified for benchmarking by a user.

DETAILED DESCRIPTION OF THE INVENTION

Figure 1:
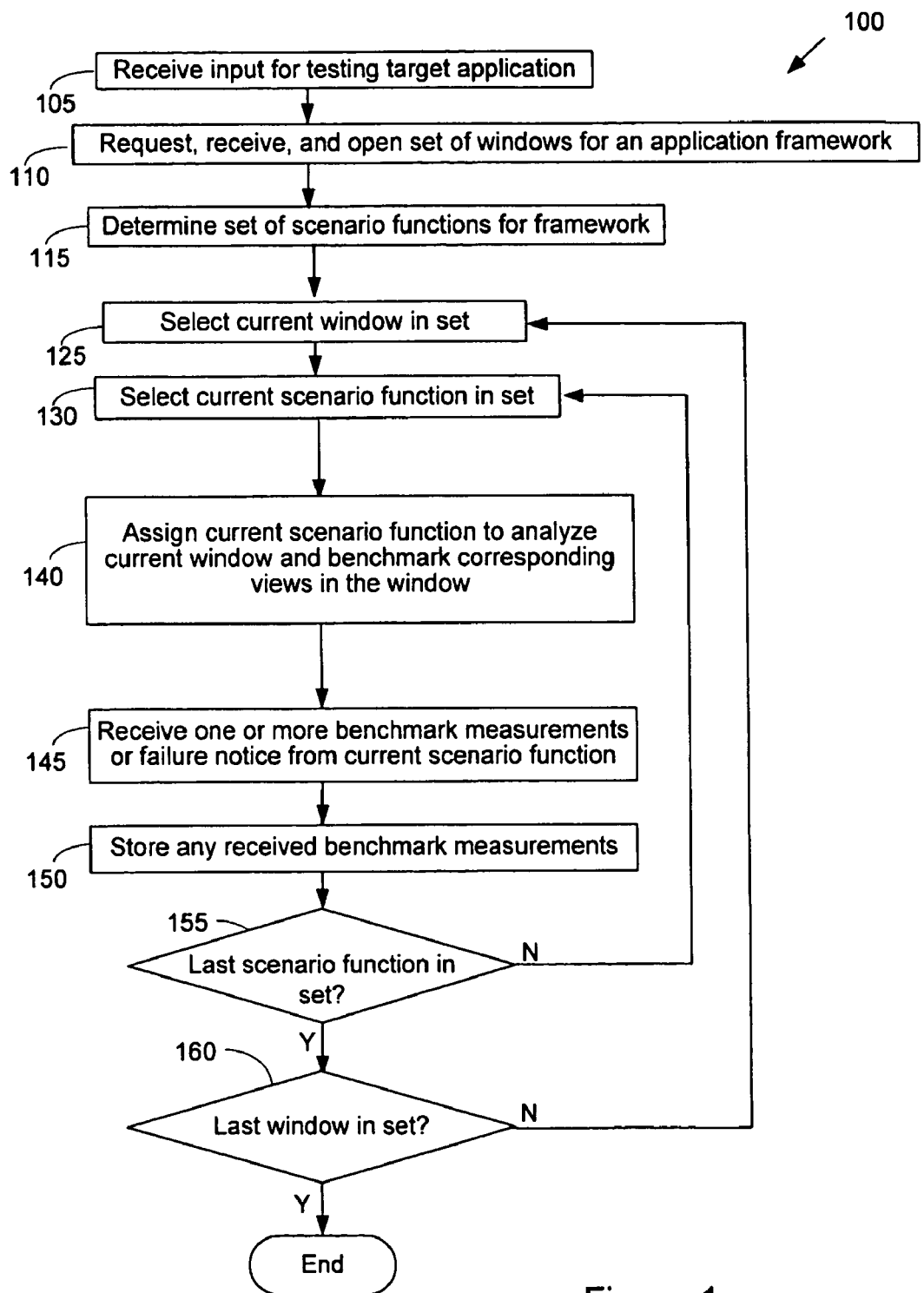
FIG. 1 is a flowchart of a general method for automated benchmarking of views of one or more windows of an application.

In the following description, numerous details are set forth for purposes of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the present invention relate to automated benchmarking of views of one or more target windows of a target application. The method analyzes the content of a target window to identify and benchmark views in the window. Views of a window may be analyzed directly through the window or through a view list or view hierarchy associated with the window. A view of a window is benchmarked by an appropriate scenario function that is designed to test a specific type of view. Each view in the set of views has one or more associated operations that can be benchmarked. As such, a set of views has an associated set of operations that are benchmarked by a set of scenario functions where a particular scenario function may benchmark one or more operations associated with a single view and/or benchmark one or more views of a window. Further, a scenario function can benchmark one or more windows of a single application. Through use of the set of scenario functions, the method benchmarks views of a window automatically (without human intervention) once a target application and/or target window have been specified for benchmarking by a user.

In some embodiments, views of a window are benchmarked through the application that creates the window. In other embodiments, a window is benchmarked directly through a resource file that defines the window without use of an application. In these embodiments, a command line tool can be used to benchmark operations across different applications. In some embodiments, the method benchmarks the performance of one or more commands of a data file.

Some embodiments of the present invention are described with reference to Apple Computer's Mac OS X operating system. However, one with ordinary skill in the arts will realize that the benchmarking methods of the present invention may be applied to different operating systems.

The description that follows is divided into five sections. General terms and concepts relating to benchmarking are discussed below in Section I. Section II describes automated benchmarking of windows through an application. Section III describes automated benchmarking directly through a resource file that defines one or more windows. Section IV describes creating customized data files for benchmarking a script command. And Section V describes automated benchmarking of a collection of introspectable objects.

Section I: Benchmarking Terms and Concepts

Views and View Hierarchies:

An application running in a Graphical User Interface (GUI) can be viewed as a collection of one or more windows, each window containing one or more views. Each view describes a particular region of a window and can be the entire window region (i.e., content view). In some embodiments, a window has an associated list of views (view list) that describes contents of the window, each view in the list dividing the window area by functionality. In some embodiments, a window has an associated view tree hierarchy containing views of the window in parent and child relationships. As such, in some embodiments, a window of an application has an associated view hierarchy or view list (a list of views not in hierarchical form).

In the embodiments where views of a window are organized in a view hierarchy, the view hierarchy constructs a hierarchical decomposition of the window area by functionality. Each view in the view hierarchy is an object that describes a particular region of a window and can be the entire window region. The entire view (i.e., the entire hierarchy of views) of a window is referred to as the content view of a window. When an application comprising a window is executed, views (objects) in the view hierarchy associated with the window are instantiated to create regions in the window.

There are several general and specific types of views. A view can be of one or more general view types but of only one specific view type. Each view has one or more associated operations/functions. Examples of general view types are drawing, compound, composite, and control views. A drawing view is a view that draws data (e.g., data describing text or graphics) in a particular region of a window. Examples of specific types of drawing views include text view, image view, etc. A compound view is a view that operates on one or more views to transform the one or more views into one or more different views. For example, a compound view may change how a particular view is drawn or how a user interacts with the view. Examples of specific types of compound views include a tab view, split view, scroll view, etc. A composite view is a fixed collection of views that composes a single compound view. Examples of specific types of composite views include a toolbar view, scroll view, table view (e.g., spreadsheet), etc.

A control view is a view that is user interactive (interactive through the GUI) and has one or more associated operations/functions. When a user interacts with a control by selecting the control, one or more operations associated with the control is performed and the appearance of at least a portion of the window changes. For example, if the user selects a menu control, an expanded menu may be opened and displayed in the window. A user may interact with and select controls of a window through the GUI using, for example, a pointing device (such as a computer mouse). Examples of specific types of control views include scroll bars, toggle buttons, resize buttons, menus, etc.

There may be one or more instances (view instances) of a specific view in a window as well, each instance of the same specific view being in a different region of the window. For example, for a scrolling control, there may be a right side scrolling bar (first instance) and a bottom side scrolling bar (second instance).

Typically, an application has one or more associated resource files (e.g., NIB files for Apple Computer's Mac OS X operating system) that define the content of one or more windows of the application. A resource file defines the views of one or more windows of the application where a plurality of resource files (a directory of resource files) or a single resource file can be used to define the various windows of an application. The resource file(s) are loaded when the associated application is run. In contrast to applications and programs, resource files (e.g., NIB files) are data files and do not contain operating code.

Benchmark Program and Scenario Functions:

Some embodiments of the present invention relate to methods for automated benchmarking of views of application windows. In some embodiments, these methods are performed by a benchmark program and a set of scenario functions. In these embodiments, the benchmark program performs benchmarking of the views of an application without requiring the addition or modification of any code in the application or requiring any prior information regarding the application. The benchmark program analyzes the content of the windows of the application to process views in the window whereby some views are benchmarked by appropriate scenario functions. Through use of the set of scenario functions, the benchmark program benchmark tests various views of a window automatically (without human intervention) once a target application and/or target window have been specified for benchmarking by a user.

Typically, the benchmark program is installed into the operating system itself. For Apple Computer's Mac OS X operating system, once the benchmark program is installed, menu options for the benchmark program would appear in the global operating system menu bar that is shared among all active applications. Such menu options would give a user, for example, options to benchmark test a particular application or a particular window of an application (as described in Section II). In other embodiments, the benchmark program is running as a command line tool so that it is receiving and executing command lines (as described in Sections III and IV).

In some embodiments, the benchmark program comprises a set of predefined scenario functions. A scenario function is designed/configured to test a particular view (i.e., a view of a specific view type) of a window, the particular view being referred to as a "corresponding view" of the scenario function that is benchmarkable by the scenario function. For example, a scrolling scenario function is designed to test a corresponding scrolling view. The scenario function benchmarks each instance of a corresponding view in the window. For example, the scrolling scenario function may benchmark a right scroll view and a bottom scroll view.

In some embodiments, the scenario functions are generic scenario functions that are configured to benchmark views of a window (test case) regardless of the predefined content of the window (i.e., are configured to benchmark views of windows having various content). As such, only one scenario function is required to benchmark a particular view in windows (test cases) having different content thus avoiding having to create a separate scenario function for each different window content.

As such, the set of scenario functions has a corresponding set of views that are able to be benchmarked by the set of scenario functions. For purposes of benchmarking, each view in the corresponding set of views has one or more associated operations that can be benchmarked. For example, a drawing view has at least an associated operation that is the drawing of the window. During benchmark testing of a view, the benchmark program activates/executes the one or more operations associated with the view and measures the time required to perform the associated operation(s).

As such, a set of views has an associated set of operations that are benchmarked by a set of scenario functions. Specifically, a scenario function may benchmark one or more operations associated with a single view of a window. Also, the scenario function can benchmark one or more views of the window, each view having one or more associated operations. Further, a scenario function can benchmark one or more windows of a single application.

Using a set of scenario functions, the benchmark program produces various benchmark measurements of the views of a window. Benchmark measurements may be expressed in several ways, for example, the time it takes for an operation associated with the view to be performed, the number of operations performed per second, etc. Other benchmark measurements may also be tested and are well known in the art.

In some embodiments, a scenario function relates to two or more windows and tests an application across two or more windows (e.g., measures the time needed to switch from one window to another window, to cycle through various windows, etc.). In some embodiments, the set of scenario functions is integrated with the benchmark program. In other embodiments, the set of scenario functions are separate from the benchmark program and are used in conjunction with the benchmark program through use of a "plug-in" mechanism.

In some embodiments, scenario functions are created for a particular application framework of an operating system. For example, for Apple Computer's Mac OS X operating system, scenario functions may be created specifically for the Cocoa, Carbon, or AppleScript application frameworks. In some embodiments, the benchmark program uses the following 22 scenario functions for testing applications for the Cocoa or Carbon application frameworks:

To test Cocoa applications and windows:
  1—Drawing CocoaWindow
    To test the redrawing of the window.
  2—LiveResize CocoaWindow
    To test the redrawing of the window from an initial size to a second size.
  3—Scrolling CocoaWindow
    To test the redrawing of the window when scrolling from an initial view position to a second view position.
  4—EnableDisable CocoaWindow
    To test the redrawing of the window when toggling between enabled and disabled states of a view.
  5—CycleKeyView CocoaWindow
    To test the redrawing of the window when cycling through different key views.
    For example, in a window where inputting the "tab" keyboard button repeatedly highlights different views in the window, this scenario function may test the time required to redraw the highlighting of the views as the are cycled through.
  6—CycleTabViewTabs CocoaWindow
    To test the redrawing of the window when cycling through different tab views.
    For example, in a window presenting multiple folders where selection of a tab on top of each folder selects the folder to bring the folder to the front, this scenario function may test the time required to redraw the window when bringing a folder from the background to the foreground.
  7—ShowHideToolbar CocoaWindow
    To test the redrawing of the window when showing and hiding a toolbar.
  8—TableTextCellEdit CocoaWindow
    To test editing of text in table view.
  9—ExpandCollapseOutlineItems CocoaWindow
    To test the redrawing of the window when expanding and collapsing an outline.
  10—HideUnhide CocoaApp
    To test the redrawing of the window when hiding and unhiding the application.
  11—CycleWindows CocoaApp
    To test the redrawing of two or more windows of the application when cycling through the windows.
To test Carbon applications and windows:
(Descriptions for Carbon scenario functions having corresponding Cocoa scenario functions described above are not included here.)
  12—Drawing CarbonWindow
  13—LiveResize CarbonWindow
  14—Scrolling CarbonWindow 15—EnableDisable CarbonWindow
16—MinimizeRestore CarbonWindow
  To test the redrawing of the window when changing between minimizing and restoring the window.
17—CycleTabViewTabs CarbonWindow
18—ShowHideToolbar CarbonWindow
19—HideUnhide CarbonApp
20—CycleWindows CarbonApp
21—NewDocument CarbonApp
  To test the redrawing of a newly created window in an application.
22—ScanMenuBar EitherApp
  To test scanning of menu bars for Cocoa and Carbon applications.

Section II: Automated Benchmark Testing of Application Windows

In some embodiments, the benchmark program automatically processes views of one or more windows of an application to produce benchmarks of one or more views. The benchmark program does so by examining the content of a window to determine the views in the window. As such, the methods performed by the benchmark program are referred to as window content driven. In these embodiments, a window to be tested is created by the application of which the window is a part. In other embodiments, a window to be tested is created directly from a resource file that defines the window without use of an application (as discussed in Section III).

FIG. 1 is a flowchart of a general method 100 for automated benchmarking of views of one or more windows of an application. The method of FIG. 1 may be implemented, for example, by a benchmark program. FIG. 1 is described in relation to FIG. 2.

The method 100 begins when it receives (at 105) an input for testing a particular application (target application), e.g., from a user through a user interface. The method then requests (at 110) from the target application all windows of a particular application framework. For example, the method may perform a system call to the operating system to request all Cocoa windows of the target application. The method then receives and opens (at 110) the set of requested windows, the set of requested windows comprising a set of target windows. Each received window is opened with assistance from the target application that creates the window.

In some embodiments, each window in the set of target windows comprises a test case having predefined content (e.g., predefined text, graphics, etc.). For example, the predefined content of a target window comprises text of the U.S. Constitution, Japanese language text, a graphic of a particular image, a mixture of graphics and text, etc. As such, in some embodiments, the set of target windows comprises a set of test cases having varying predefined content.

The method then determines (at 115) a set of scenario functions that are designed to benchmark views of applications of the particular application framework. For example, if the particular application framework is Cocoa, the method determines a set of scenario functions that are configured to test views of Cocoa applications. Each scenario function in the set is designed/configured to test a particular view (i.e., a specific view type) of a window (e.g., a scrolling scenario function is designed to test a scrolling view).

Figure 2:
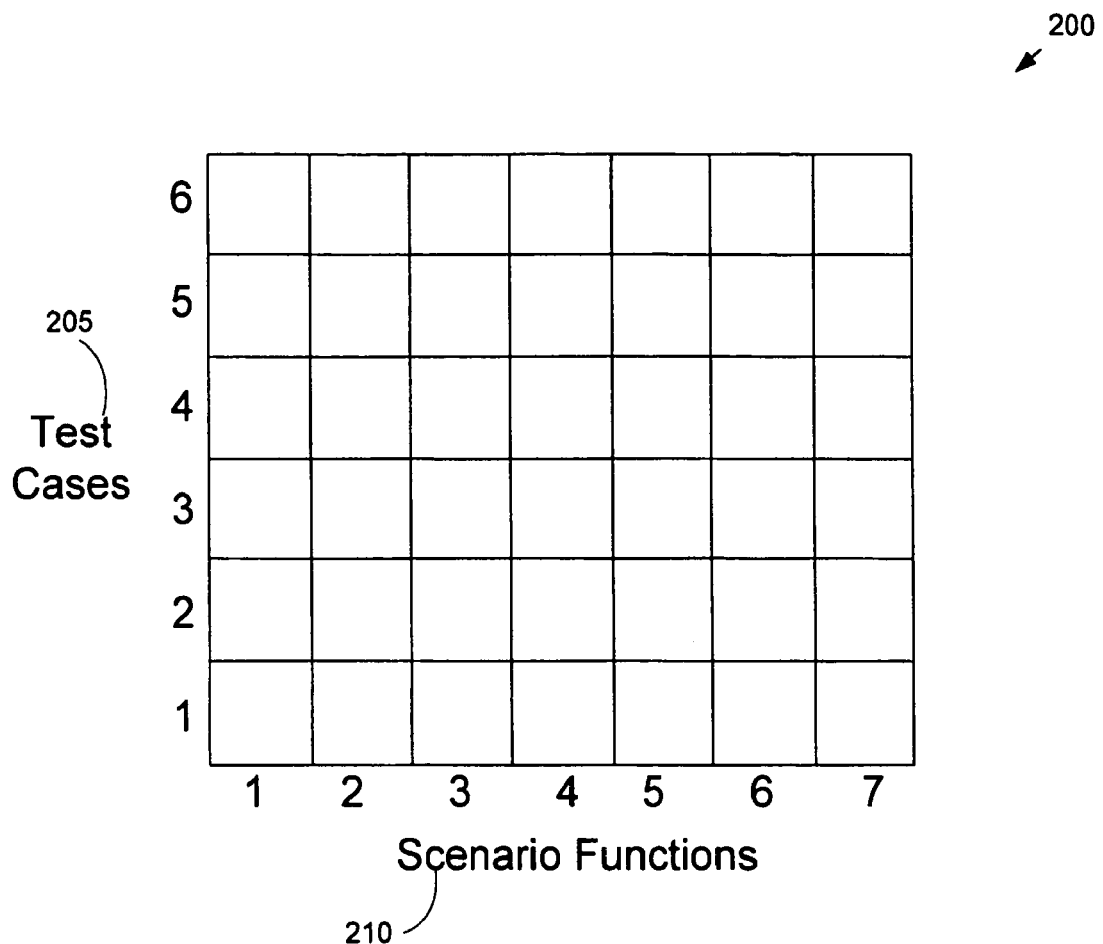
FIG. 2 shows a conceptual diagram of a test matrix.

Through the set of target windows (requested for and opened at 110) and the set of scenario functions (determined at 115), a test matrix is created where one axis of the test matrix comprises target windows (test cases) and another axis comprises scenario functions. FIG. 2 shows a conceptual diagram of a test matrix 200. As shown in FIG. 2, a first axis 205 of the test matrix 200 comprises target windows (test cases) and a second axis 210 of the test matrix 200 comprises scenario functions.

In some embodiments, the scenario functions are generic scenario functions that can process windows (test cases) having various content. As such, only one scenario function is required to benchmark a particular view in different windows (test cases) having various content thus avoiding having to create a separate scenario function for each different window content. In the example shown in FIG. 2, the test matrix 200 comprises six target windows (test cases) and seven scenario functions. As such, only six target windows (test cases) and seven scenario functions need to be created under these embodiments. This avoids having to create six target windows (test cases) and forty-two scenario functions (one scenario function for each different test case). The method 100 performs benchmarking of various target windows (test cases) across various scenario functions (as conceptually illustrated in the test matrix of FIG. 2) by performing iterative testing through the various target windows (test cases) and scenario functions (by performing steps 125 through 160).

At step 125, the method selects a current window in the set of target windows and selects (at 130) a current scenario function in the set of scenario functions. The method then assigns (at 140) the current scenario function to process the current window by analyzing the content of the current window and benchmarking any views (referred to as corresponding views) in the window that the current scenario function is designed/configured to benchmark. A method 300 for processing the current window is discussed below in relation to FIG. 3.

From the current scenario function, the method then receives (at 145) either one or more benchmark measurements (if the current window contained any corresponding benchmarkable views) or a "not applicable" notice (if the current window did not contain any corresponding benchmarkable views). More than one benchmark measurement may be received if more than one instance of a corresponding view is contained in the current window and is tested by the current scenario function. More than one benchmark measurement may also be received if the current scenario function is testing for more than one benchmark measurement for each corresponding view in the current window. The method then stores (at 150) any received benchmark measurements.

The method 100 then determines (at 155) whether the current scenario function is the last scenario function in the set of scenario functions. If not, the method proceeds to step 130 where a next current scenario function in the set of scenario functions is selected. If so, the method 100 determines (at 160) whether the current window is the last window in the set of windows. If not, the method proceeds to step 125 where a next current window in the set of windows is selected. If so, the method ends.

The method 100 can then be repeated to test windows of the target application having a different application framework. For example, the method 100 may be repeated to benchmark all Carbon windows of the target application.

In an alternative embodiment, a single window (test case) of an application is benchmarked. The method 100 of FIG. 1 can be easily adapted to do so. For example, at step 105, the method 100 receives an input for testing a particular target window of a target application (e.g., from a user through the GUI), the target application having a particular application framework. The method then opens (at 110) the target window (if not opened already) and determines (at 115) a set of scenario functions that are designed to test applications of the particular application framework The method then iterates through steps 130-155 to automatically benchmark one or more views in the target window.

Figure 3:
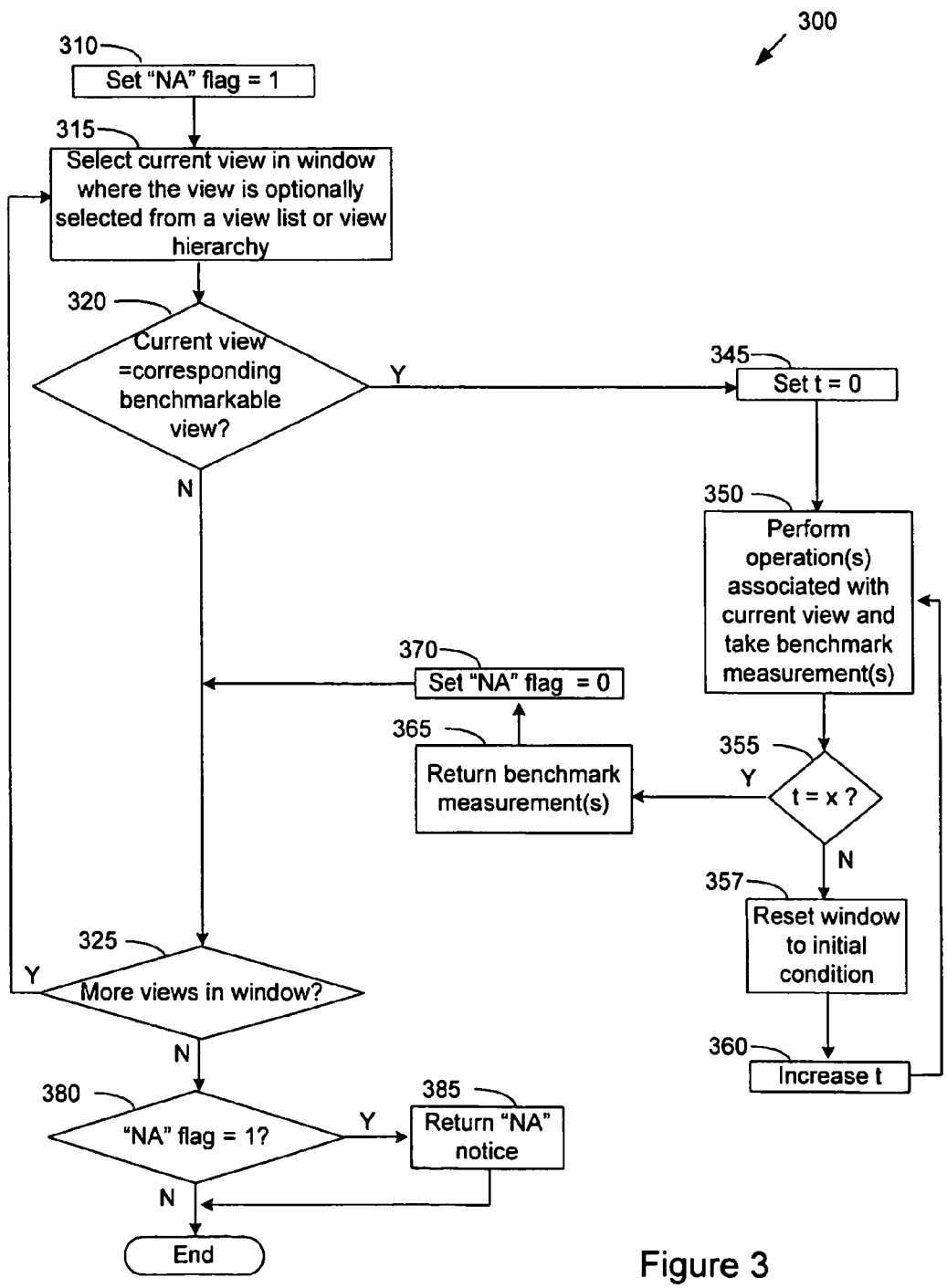
FIG. 3 is a flowchart of a method for processing the content of a window to benchmark views of the window.

FIG. 3 is a flowchart of a method 300 for analyzing the content of a window to benchmark views of the window. The method of FIG. 3 may be implemented, for example, by a scenario function of a benchmark program. FIG. 3 is described in relation to FIGS. 1, 4, 5, 6A-B, and 7A-B.

The method 300 begins when the general method 100 assigns (at 140) a scenario function to process a target window (test case) by analyzing the content of the target window and benchmarking any corresponding views in the window that the scenario function is designed/configured to benchmark. In some embodiments, the views of the target window are organized in a view list associated with the target window. In some embodiments, the views of the target window are organized in a view hierarchy associated with the target window. In these embodiments, the scenario function processes a target window by analyzing (walking) the view hierarchy of the target window and benchmark any corresponding views in the hierarchy.

The method 300 begins by setting (at 310) a "not applicable" flag to equal 1 (indicating by default that the target window/hierarchy does not contain any corresponding benchmarkable views for the scenario function assigned to process the target window/hierarchy). The method 300 then selects (at 315) a current view in the window. In some embodiments, the current view is selected from a view list or view hierarchy.

The method then queries the current view to determine (at 320) whether the scenario function is able to benchmark the current view (i.e., whether the current view is a corresponding benchmarkable view that the scenario function is configured to benchmark). In some embodiments, views are represented in an object oriented language whereby the method 300 queries the current view to identify the class of the current view to determine (at 320) the applicability of the scenario function to the current view (i.e., whether the current view is a corresponding view). Querying views in this manner at a class level allows querying of views on a more generic/general level.

If the method determines (at 320—No) that the current view is not a corresponding view, the method determines (at 325) whether there are more views in the target window to be processed. In some embodiments, the method determines (at 325) whether there are more views in a view list or view hierarchy associated with the target window to be processed. If so, the method selects (at 315) a next current view in the window for processing.

If the method determines (at 320—Yes) that the current view is a corresponding benchmarkable view, the method then sets (at 345) a variable t to equal 0 where the variable t counts the number of test iterations performed at step 350. The method then benchmarks the current view by performing/activating (at 350) one or more operations/functions associated with the current view and benchmarking the associated operation(s)/function(s) (e.g., by measuring the time required to complete the performance of the associated operation(s)/function(s)).

Before the associated operation(s)/function(s) are performed, the target window is considered to have an initial state/appearance. When the associated operation(s)/function (s) are performed/activated, typically the initial state/appearance of the target window is changed. In some embodiments, step 350 is performed in conjunction with a benchmark program that measures the benchmark scores of the current view. For example, the benchmark scores that are measured may be operations per second performed, the time required to perform the operation, etc. Step 350 comprises benchmarking of the target window and current view.

The method then determines (at 355) whether the iteration variable t is equal to x, x being a predetermined value that determines the number of benchmarking iterations to be performed. If not, the method resets (at 357) the target window to restore the target window to its initial state/appearance. The method increases (at 360) the variable t and proceeds to step 350 where the view is benchmarked again.

If the method determines (at 355—Yes) that the variable t is equal to x, the method returns (at 365) the benchmark scores/measurements taken at step 350. In some embodiments, the method returns the benchmark scores to the benchmark program. The method then sets (at 370) the "not applicable" flag to equal 0 to indicate that the target window/hierarchy contains at least one corresponding benchmarkable view for the assigned scenario function.

The method then determines (at 325) whether there are more views in the target window to be processed. If so, the method selects (at 315) a next current view in the window for processing. If not, the method determines (at 380) whether the "not applicable" flag is equal to 1 (indicating that the target window contains no corresponding benchmarkable views for the assigned scenario function). If so, the method returns (at 385) a "not applicable" notice and the method ends. In some embodiments, the method returns the "not applicable" notice to the benchmark program. If the "not applicable" flag is not equal to 1, the method ends.

The following is an example of how the method 3 of FIG. 3 benchmarks views of a target window. In the example described below, a target window is analyzed and benchmarked through a view hierarchy associated with the target window. In other embodiments, however, the target window is analyzed and benchmarked directly through the window or through a view list associated with the target window.

Figure 4:
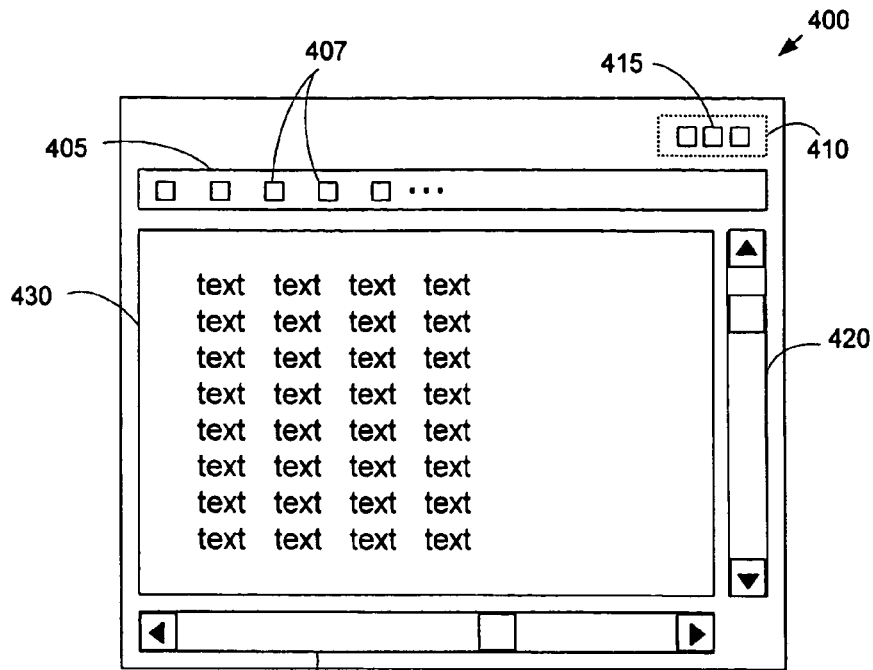
FIG. 4 shows an example of a window for a generic word processing application.

FIG. 4 shows an example of a target window 400 for a generic word processing application. The window 400 contains various views including a toolbar 405, window frame controls 410, a right scroll bar 420, a bottom scroll bar 425, and a text area 430 that displays text. The toolbar 405 is also comprised of various views 407 (e.g., print document tool, save document tool, etc.). Further, the window frame controls 410 are also comprised of various views including a maximize control 415. In the example of FIG. 4, the content of the window comprises text (as shown in the text area 430).

Figure 5:
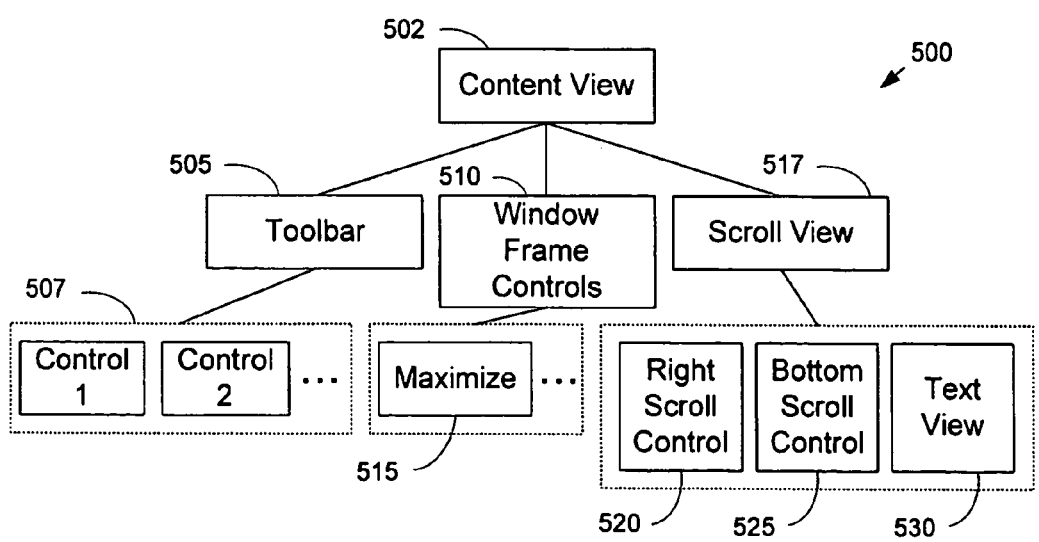
FIG. 5 show a conceptual diagram of a view hierarchy for the window of FIG. 4.

FIG. 5 show a conceptual diagram of a view hierarchy 500 for the window 400 of FIG. 4. As shown in FIG. 5, the highest view in the hierarchy 500 is a content view 502 (representing the entire view of the window 400). The content view 502 has three children: a toolbar 505 (representing the toolbar 405 of the window 400), window frame controls 510 (representing the window frame controls 410 of the window 400), and a scroll view 517. The toolbar 505 has various children 507 (representing the various views 407 of the toolbar 405) and the window frame controls 510 has various children (representing the various views of the window frame controls 410) including a maximize view 515 (representing the maximize control 415 of the window frame controls 410). The scroll view 517 has three children: a right scroll bar view 520 (representing the right scroll bar 420), a bottom scroll bar view 525 (representing the bottom scroll bar 425), and a text view 530 (representing the text area 430).

In a first example, the scenario function assigned to process the view hierarchy is a resize scenario function designed to benchmark a view that is resizable. A resizable view has at least an associated operation/function that resizes and redraws the target window from an initial size to a second size. As such, the resize scenario function is configured to benchmark test the resizing and redrawing of the target window from an initial size to a second predetermined size.

In this first example, the method 300 would determine (at 320—No) that various views of the view hierarchy 500 are not corresponding views (e.g., the views 507 of the toolbar 505, the scroll bar views 520 and 525, the views of the window frame controls 510 other than the maximize view 515, etc.). As such, these views in the hierarchy would be disregarded.

Figure 6A:
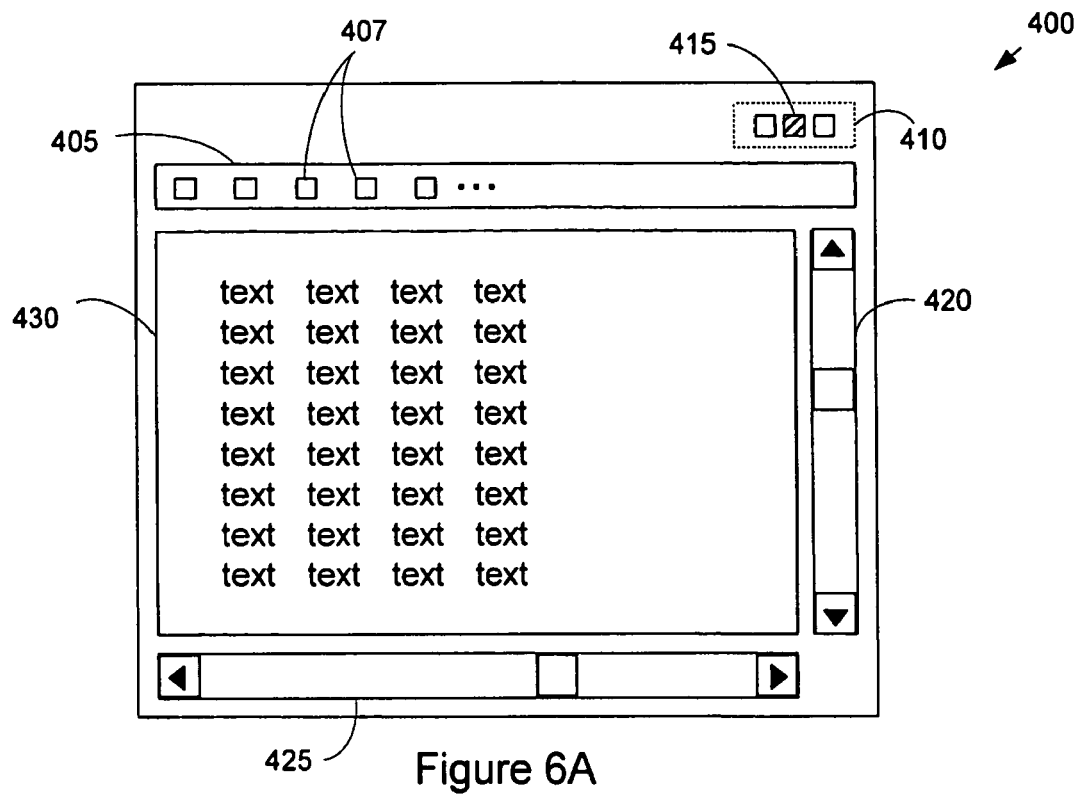
FIG. 6A shows an example of an initial state of the window shown in FIG. 4.

When the method queries the maximize view 515, however, it would determine (at 320—Yes) that the maximize view 515 is a corresponding view that the resize scenario function is designed to benchmark. FIG. 6A shows an example of an initial state of the window 400 shown in FIG. 4 for a generic word processing application. In the example of FIG. 6A, the maximize control 415 is indicated by a hatched box. The method would then perform (at 350) the resize operation/function associated with the maximize view and benchmarks the associated operation/function according to one or more measurements to score the performance of the target window 400 and maximize control 415.

Figure 6B:
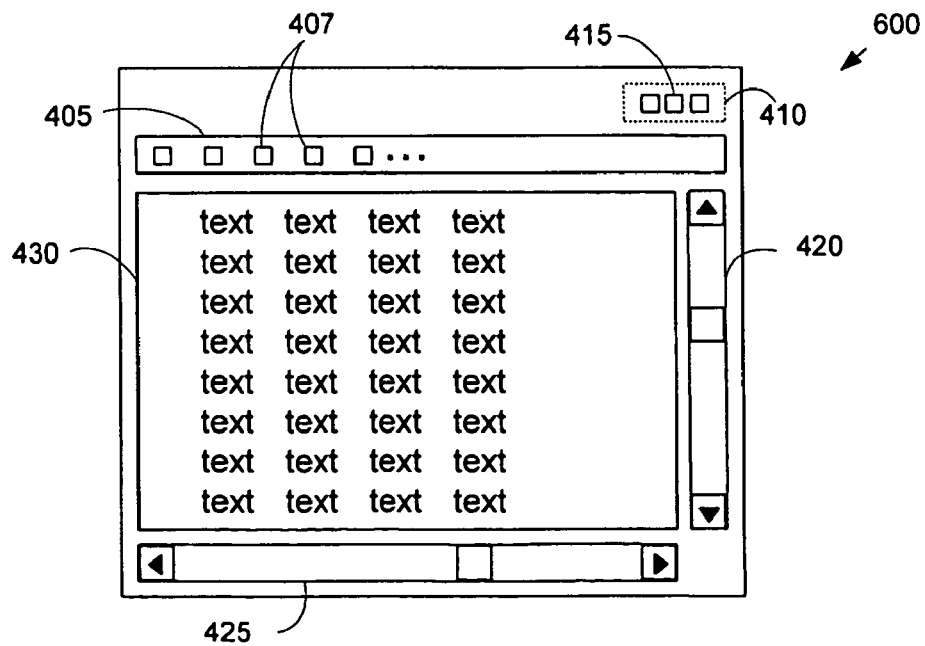
FIG. 6B shows the window of FIG. 6A after it has been resized to a smaller size.

When the associated operation/function is performed, the initial state/appearance of the target window is changed, as shown by the resized target window 600 of FIG. 6B. In the example of FIG. 6B, the target window has been resized to a smaller predetermined size. As such, the method may measure the time required to redraw the target window when it is resized from an initial size to a second predetermined size. The method then performs the benchmarking of the target window and resize view for x number of iterations and returns (at 365) the benchmark scores.

In a second example, the scenario function assigned to process the view hierarchy is a scroll bar scenario function designed to test a scroll bar view. In this second example, the method 300 would determine (at 320—No) that various views of the hierarchy 500 are not corresponding views (e.g., the views 507 of the toolbar 505, the views of the window frame controls 510, etc.). As such, these views in the hierarchy would be disregarded.

Figure 7A:
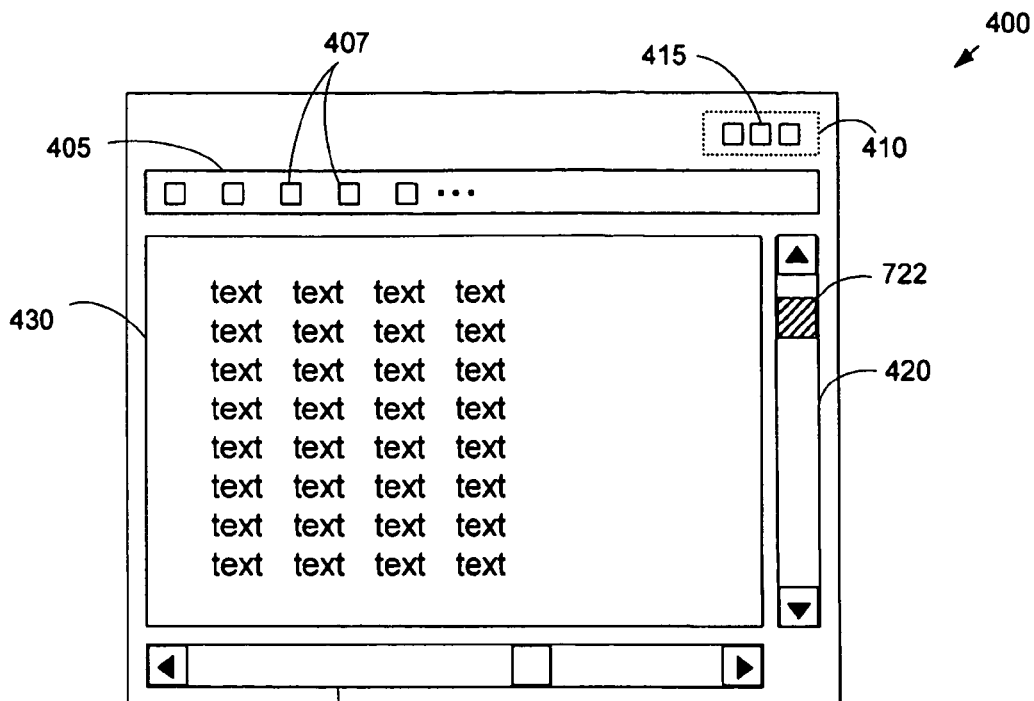
FIG. 7A shows an example of first view position of the window shown in FIG. 4.

When the method queries the right scroll bar view 520, however, it would determine (at 320—Yes) that it is a corresponding view that the scroll bar scenario function is designed to benchmark. FIG. 7A shows an example of an initial state of the window 400 shown in FIG. 4. As shown in FIG. 7A, the right scroll bar 420 (represented by the right scroll bar view 520 in the hierarchy 500) includes a scroll tab 722 indicated by a hatched box. The scroll tab 722 is at an initial tab position which produces an initial view position of the text area 430.

Figure 7B:
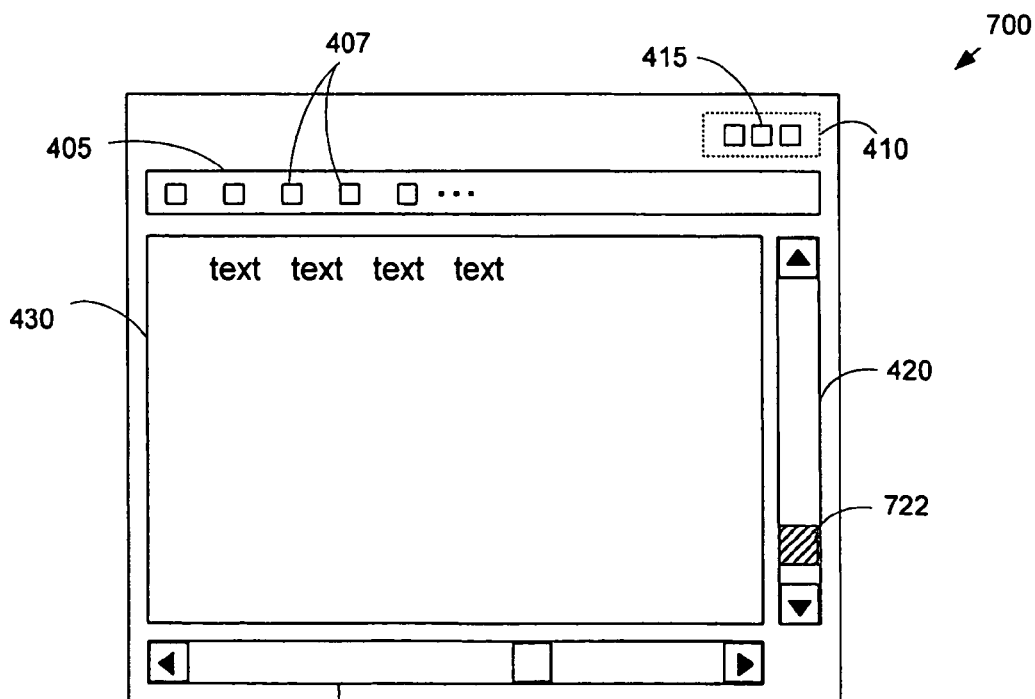
FIG. 7B shows the window of FIG. 7A after it has been scrolled to a second view position.

The method would then perform (at 350) at least the scroll bar operation/function associated with the scroll bar view by running the scroll tab 722 through a predetermined range while measuring one or more benchmarks of the target window and scroll bar view. When the associated operation/function is performed, the initial state/appearance of the target window is changed, as shown altered window 700 shown in FIG. 7B. In the example of FIG. 7B, the scroll tab 722 is at a second tab position which produces a second view position of the text area 430. As such, the method benchmarks the redrawing of the target window when scrolling from an initial view position to a second view position. The method then performs the benchmarking of the target window and scroll bar view for x iterations and returns (at 365) the benchmark scores. A similar process would be performed for the bottom scroll bar view 525 of the hierarchy 500.

Below are example benchmark scores that may be produced by the two examples discussed above:

| Control | Time | Ops/Sec |
|---|---|---|
| Scrolling | .02 | 50.0 |
| Live Resize | .03 | 33.3 |

Section III: Benchmark Testing of Resource Files

In some embodiments, a window is benchmarked directly through a resource file that defines the window without use of an application. In these embodiments, a window to be benchmarked is created by processing/executing a resource file that defines the window. Compared to performing benchmarking on windows created through an application (as discussed in Section II), an advantage of performing benchmarking on windows created directly from a resource file is that more stable repeatable benchmarks can typically be achieved. Since the resource files are data files and not code files, this type of benchmarking is data driven as well as window-content driven (since the content of a window is also examined). An example of a resource file is a NIB file for Apple Computer's Mac OS X operating system.

Further, in the embodiments described in Section II, the operations of the benchmark program are typically managed through menu options. In the embodiments described in this Section, the benchmark program is typically running as a command line tool so that it is receiving and executing command lines. As such, the benchmark program can benchmark operations across different applications rather than being confined to benchmarking within a single application.

Figure 8:
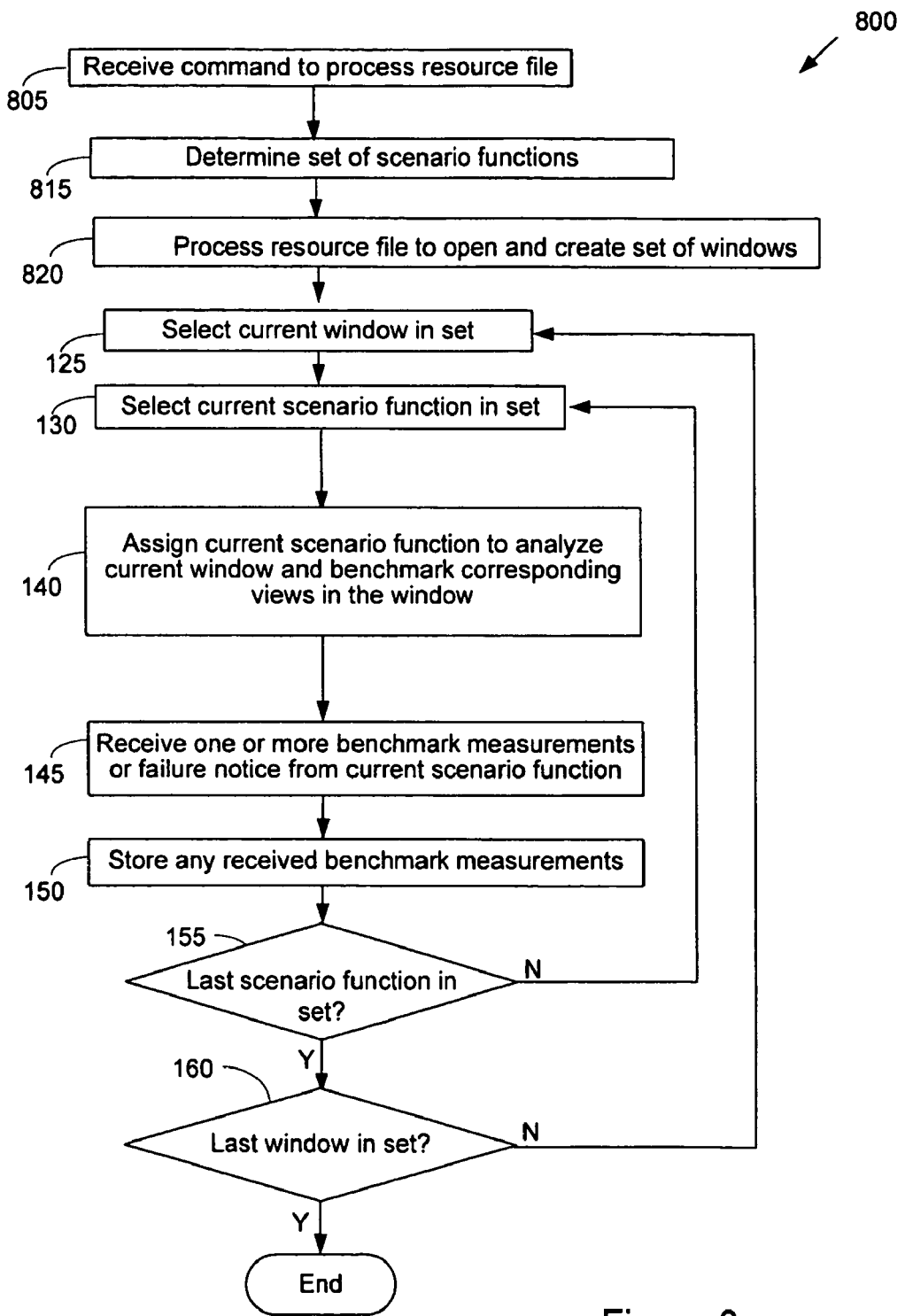
FIG. 8 is a flowchart of a method for automated benchmarking of views of one or more windows defined in a resource file.

FIG. 8 is a flowchart of a method 800 for automated benchmarking of views of one or more windows defined in a resource file. The method 800 may be implemented, for example, by a benchmark program. In some embodiments, the benchmark program is running as a command line tool so that it is receiving and executing command lines. The method 800 of FIG. 8 contains steps similar to the general method 100 of FIG. 1 and only those steps that differ are discussed in detail here.

The method 800 begins when it receives (at 805) a command to process/execute a resource file that defines the content (including the views) of one or more windows (set of target windows). The method then determines (at 815) a set of scenario functions. The method then processes/executes (at 820) the target file to create and open a set of target windows defined by the resource file. Once a set of windows is created, the content of each window can be processed for benchmarking as described in Section II. As such, in the remainder of the method 800 (steps 125 through 160), the method 800 performs steps similar to the general method 100 of FIG. 1.

Section IV: Creating Customized Scenario Functions Using Data Files

In some embodiments, the benchmark program processes/executes a customized data file and benchmarks the operation of one or more script commands of the data file. Since the data files described here are data files and not code files, this type of benchmarking is data driven. Examples of data files are AppleScript (for the Apple operating system) and Visual Basic Scripting files (for the Microsoft Windows operating system). AppleScript is a native scripting technology that enables direct view over applications and application windows through commands (scripts).

The data file contains arbitrary user defined operations/scripts which can then be executed and benchmarked by the benchmark program. User defined operations to be benchmarked may include any operation that can be scripted in a data file.

Figure 9:
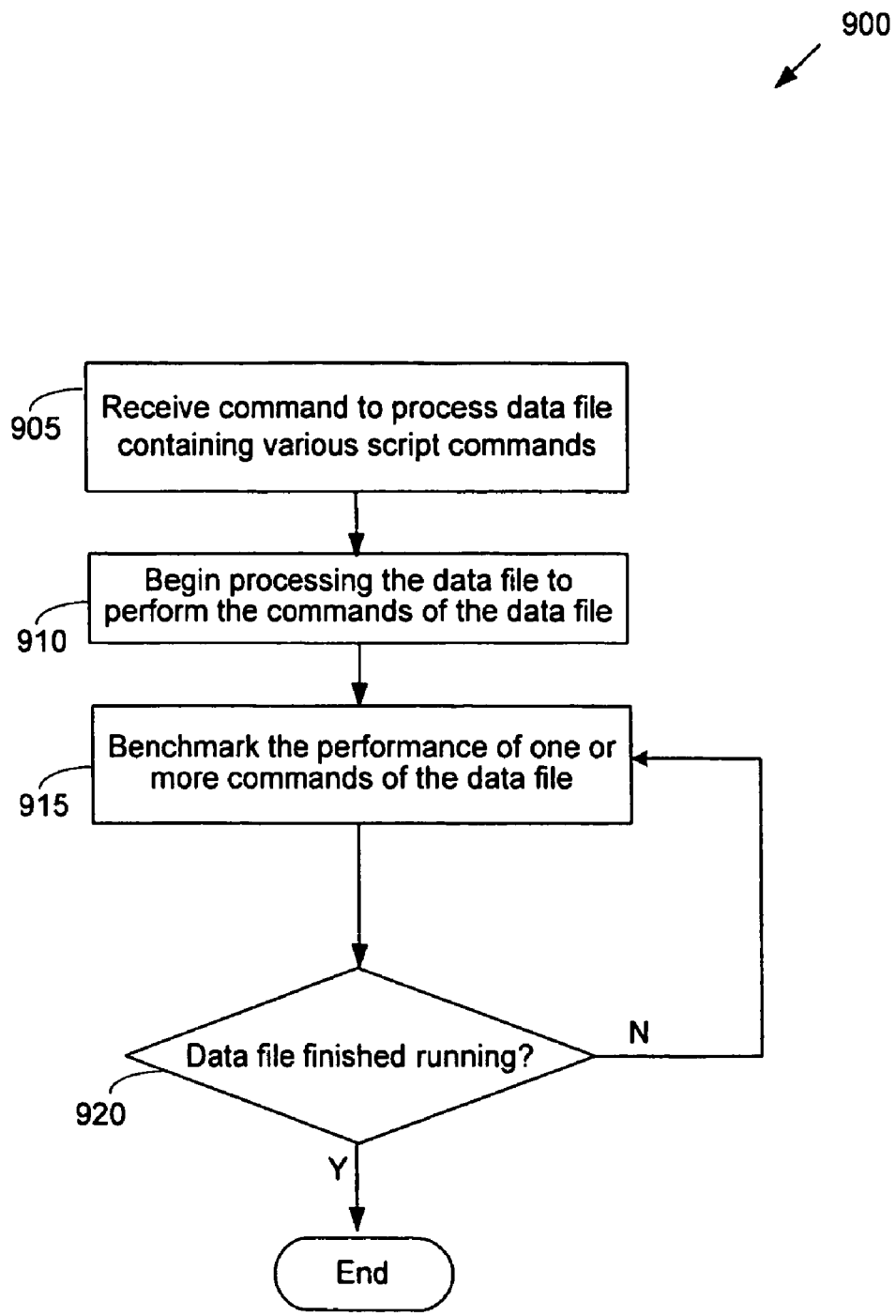
FIG. 9 is a flowchart of a general method for benchmarking commands in a data file.

FIG. 9 is a flowchart of a general method 900 for benchmarking commands in a data file. The method 900 may be implemented, for example, by a benchmark program. In some embodiments, the benchmark program is running as a command line tool so that it is receiving and executing command lines and able to process/execute data files containing scripted commands.

The method 900 begins when it receives (at 905) a command to process a data file (e.g., AppleScript file) that contains various script commands. The method begins processing/running (at 910) the data file to perform the commands of the file. While the commands of the data file are being performed, the method benchmarks (at 915) the performance of one or more commands in the data file (e.g., by measuring the time required for a command to complete). The method then determines (at 920) whether the data file has finished processing/running. If not, the data file is still running through more testing iterations and the method continues to measure benchmark scores at step 915. If so, the method ends.

As stated above, user defined operations to be benchmarked may include any operation that can be scripted in a data file (e.g., copying files, deleting files, compiling a program, etc.). As a further example, a data file may contain a run command for a particular view of a window. By benchmarking the run command for the particular view (i.e., by benchmarking the time needed for the run command to complete), the particular view can be benchmarked. As such, data files can be created to benchmark a particular view of an application window that is not able to be benchmarked by the set of scenario functions of the benchmark program. For example, a view requiring more complex user interactions with an application may not have a corresponding scenario function that has been designed to test the view. Through creation of a simple data file containing a few commands, a specific view of an application window can be benchmarked. This is easier and less time consuming than creating a scenario function (that contains code as opposed to data) to test the specific view.

In some embodiments, the data file comprises four commands: initialization, run, reset, and finalization commands. In some embodiments, the data file is an AppleScript file created by a property list file having filetype ".vscript." In some embodiments, AppleScript file comprises a run command and various testing set-up commands. In some embodiments, the property list of the AppleScript file comprises the following commands/scripts:

1. initializationScript
   This command may be used, for example, to open a target window to be tested.
2. runScript
   This command may be used, for example, to perform an operation/function associated with a particular view of the target window (which typically changes an initial state/appearance of the target window). This is the command that is benchmarked.
3. resetScript
   This command is run after the runScript command is performed to restore the target window to its initial state/appearance (i.e., the state/appearance before the runScript command was performed).
   In some embodiments, the runScript and resetScript commands are run iteratively as a pair a predetermined number of times (as specified in the data file) to benchmark the view the predetermined number of times.
4. finalizationScript
   This command is run after the runScript and resetScript iterations are completed to perform processes to finish the testing (e.g., close the target window, etc.).

The following is an example of an AppleScript file for benchmarking a pane-switching view of a "Systems Preferences" application window. The operation/function associated with the pane-switching view that is to be tested is the redrawing of the application window when switching between two panes.

```
initializationScript   -e 'tell application"System Preferences"' -e 'activate' -e 'end tell'
runScript              -e 'tell application"System Preferences"' -e 'set current pane to pane
"com.apple.preferences.sharing"' -e 'end tell'
resetScript            -e 'tell application"System Preferences"' -e 'set current pane to pane
"com.apple.preference.digihub.discs"' -e 'end tell'
finalizationScript     -e 'tell application"System Preferences"' -e 'quit' -e 'end tell'
```

Figure 10:
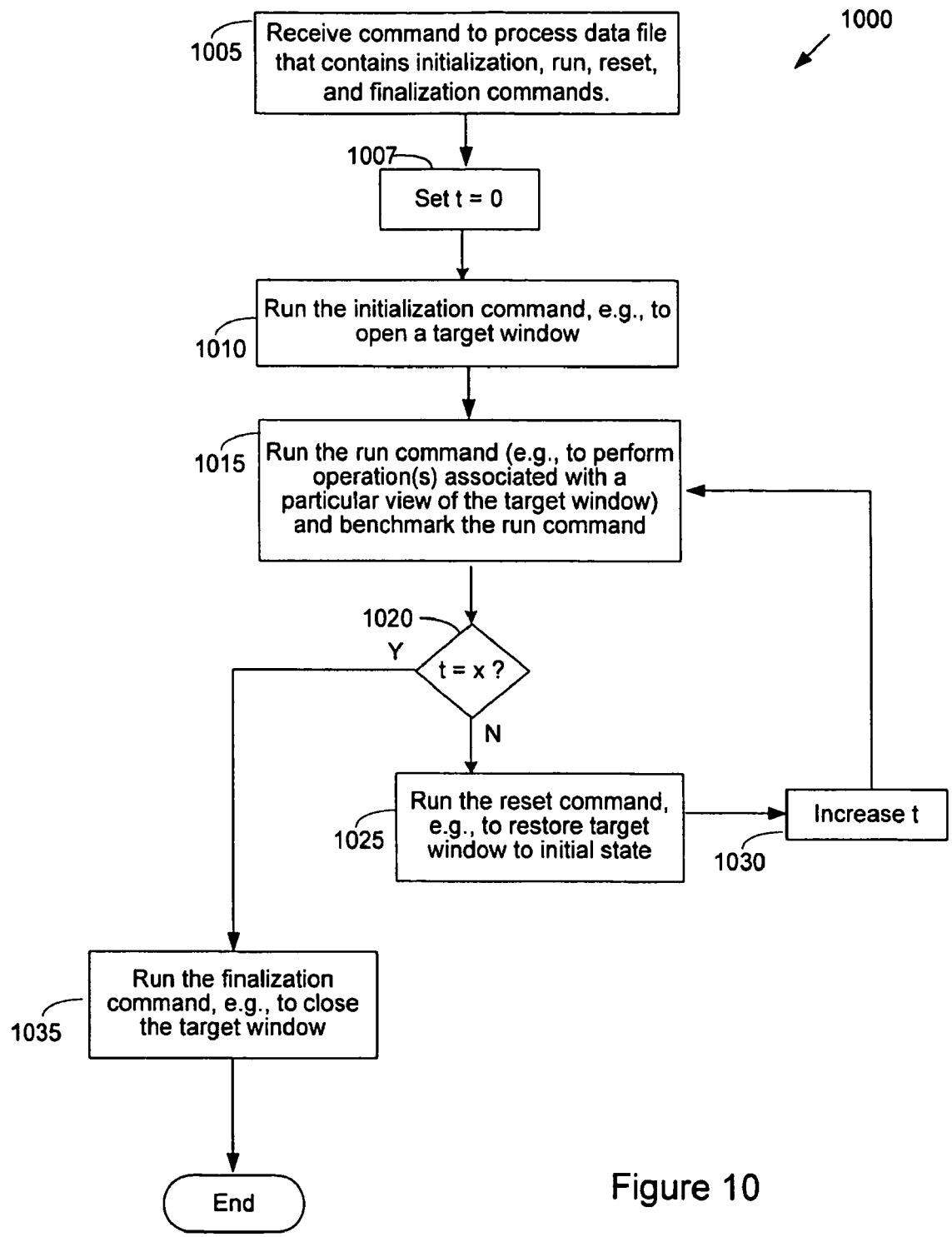
FIG. 10 is a flowchart of a method for benchmarking a run command in a data file that also contains initialization, reset, and finalization commands.

FIG. 10 is a flowchart of a method 1000 for benchmarking a run command in a data file that also contains initialization, reset, and finalization commands. The method 1000 begins when it receives (at 1005) a command to process the data file (e.g., AppleScript file) containing a run command and various testing set-up commands (initialization, reset, and finalization commands). The method then sets (at 1007) a variable t to equal 0 where the variable t counts the number of benchmark iterations to be performed at step 1015.

The method then runs (at 1010) the initialization command of the data file, e.g., to open a target window. The method then runs (at 1015) the run command of the data file (e.g., to perform one or more operations/functions associated with a particular view of the target window) while also benchmarking the run command (e.g., measuring the time required for the run command to complete execution). If the run command is for a particular view of a window, the benchmarking may comprise, for example, measuring the time required for the one or more operations/functions associated with the particular view to complete.

The method then determines (at 1020) whether the iteration variable t is equal to x, x being a predetermined value that determines the number of benchmarking iterations to be performed. If not, the method runs (at 1025) the reset command of the data file, e.g., to restore the target window to its initial state (its state before the run command was executed). The method increases (at 1030) the variable t and proceeds to step 1015 where the run command is benchmarked again. If t is equal to x, the method then runs (at 1035) the finalization command of the data file, e.g., to close the target window. The method then ends.

Section V: Automated Benchmark Testing of a Collection of Introspectable Objects In some embodiments, the benchmark program automatically processes a collection of introspectable objects to produce benchmarks of one or more introspectable objects. In some embodiments, a collection is a directory or container of objects. For example, in the embodiments described above in Section II, the window of views is considered a collection of introspectable objects. In the embodiments described below, an introspectable object is any object that can be queried/analyzed for attributes that describe the object. Examples of introspectable objects are bitmaps, files, directories, hardware device drivers, etc. This list of examples is not exhaustive, however, and any collection of objects that can be queried/analyzed for attributes can be automatically benchmarked by the methods of the present invention. In addition, as used herein, an object has one or more operations/functions associated with the object that can be measured for performance.

Figure 11:
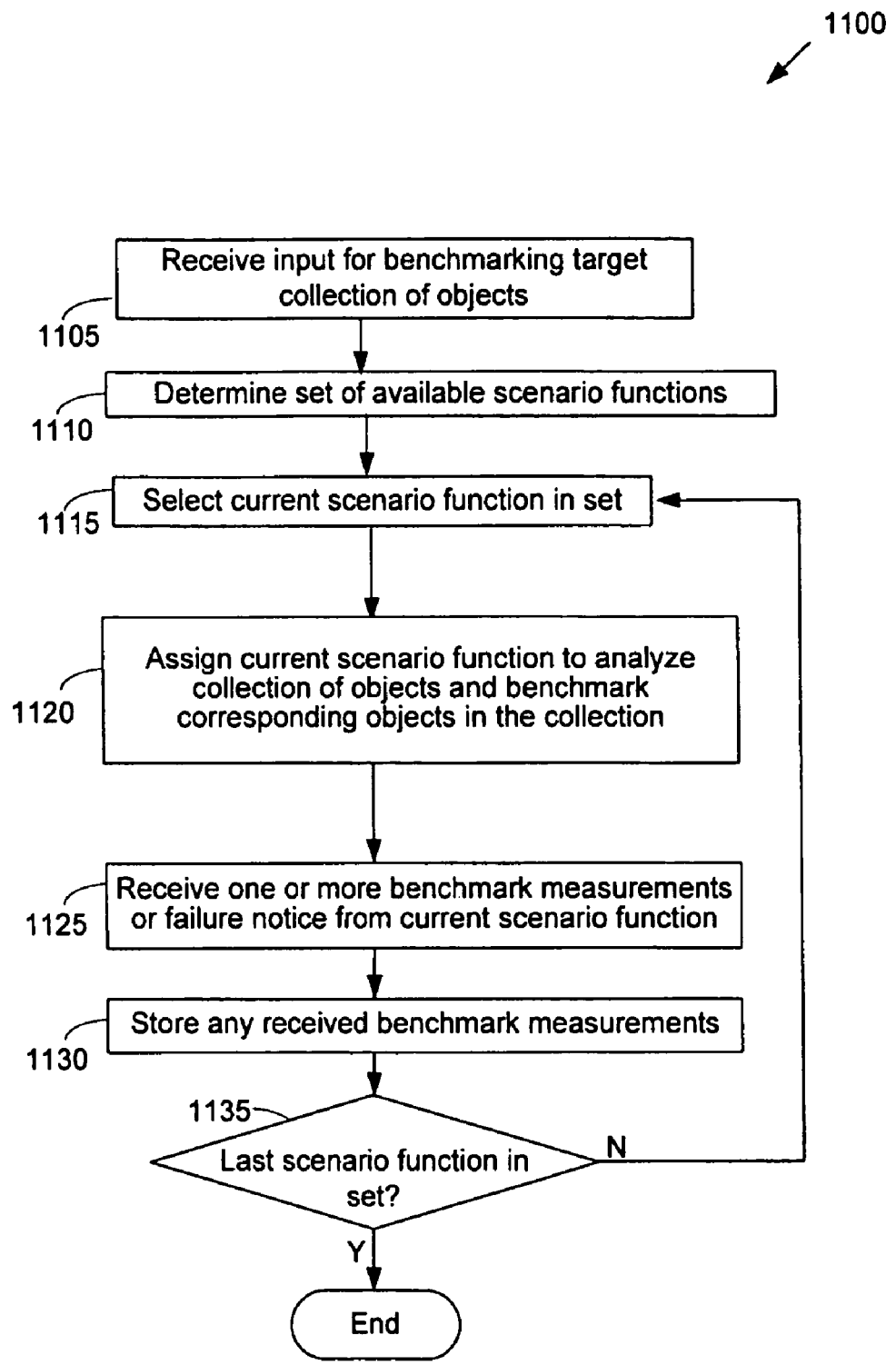
FIG. 11 is a flowchart of a general method for automated benchmarking of a collection of introspectable objects.

FIG. 11 is a flowchart of a general method 1100 for automated benchmarking of a collection of introspectable objects. The method of FIG. 11 may be implemented, for example, by a benchmark program. The method 1100 begins when it receives (at 1105) an input for benchmarking a particular collection of objects (target collection), e.g., from a user through a user interface. The method then determines (at 1110) a set of scenario functions that are available for benchmarking objects. The set of scenario functions are predefined where each scenario function in the set is designed/configured to test a particular object (i.e., a specific object type). An object is benchmarkable by a scenario function if the object is of the particular type that the scenario function is configured to benchmark.

At step 1115, the method selects a current scenario function in the set of scenario functions. The method then assigns (at 1120) the current scenario function to process the collection of objects by analyzing the objects of the collection and benchmarking any objects (referred to as corresponding objects) in the collection that the current scenario function is designed/configured to benchmark. A method 1200 for processing the collection of objects is discussed below in relation to FIG. 12.

From the current scenario function, the method then receives (at 1125) either one or more benchmark measurements (if the target collection contained any corresponding benchmarkable objects) or a "not applicable" notice (if the target collection did not contain any corresponding benchmarkable objects). The method then stores (at 1130) any received benchmark measurements. The method 1100 then determines (at 1135) whether the current scenario function is the last scenario function in the set of scenario functions. If not, the method proceeds to step 1115 where a next current scenario function in the set of scenario functions is selected. If so, the method ends.

Figure 12:
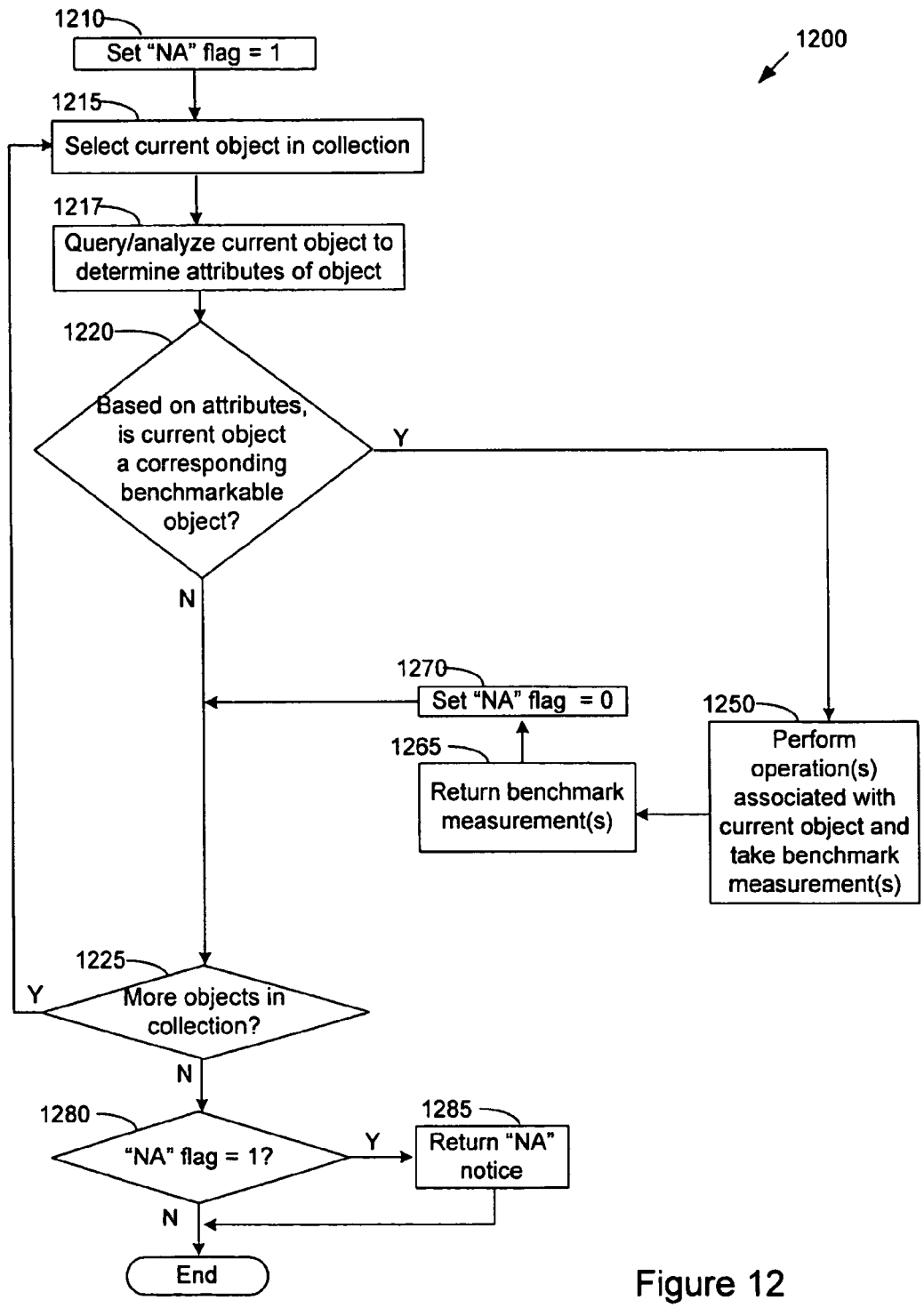
FIG. 12 is a flowchart of a method for analyzing introspectable objects of a collection to benchmark one or more objects of the collection.

FIG. 12 is a flowchart of a method 1200 for analyzing introspectable objects of a collection to benchmark one or more objects of the collection. The method of FIG. 12 may be implemented, for example, by a scenario function of a benchmark program. FIG. 12 is described in relation to FIG. 11.

The method 1200 starts when the general method 1100 assigns (at 1120) a scenario function to analyze a target collection to benchmark any corresponding objects in the target collection that the scenario function is designed/configured to benchmark. The method 1200 then begins by setting (at 1210) a "not applicable" flag to equal 1 (indicating by default that the target collection does not contain any corresponding benchmarkable objects for the scenario function assigned to process the target collection). The method 1200 then selects (at 1215) a current introspectable object in the collection.

The method queries/analyzes (at 1217) the current object to determine one or more attributes of the object. By querying the object, the method performs content analysis or introspection of the object to determine its attributes. An attribute of an object may be any data that describes the object. Although the following list is not exhaustive, examples of object attributes are file type, title, date created, access permissions, ownership, size, dependent resources, etc. In some embodiments, an object has associated meta-data that describes the object. In these embodiments, the method performs introspection using the associated meta-data of an object to determine attributes of the object.

Based on the determined attributes, the method then determines (at 1220) whether the scenario function is able to benchmark the current object (i.e., whether the current object is a corresponding benchmarkable object that the scenario function is configured to benchmark). If the method determines (at 1220—No) that the current object is not a corresponding object, the method determines (at 1225) whether there are more objects in the target collection to be processed. If so, the method selects (at 1215) a next current object in the collection for processing.

If the method determines (at 1220—Yes) that the current object is a corresponding benchmarkable object, the method then benchmarks the current object by performing/activating (at 1250) one or more operations/functions associated with the current object and benchmarking the associated operation(s)/function(s) (e.g., by measuring the time required to complete the performance of the associated operation(s)/function(s)). For example, an object that is a bitmap may have an associated drawing operation/function that is tested for performance. As a further example, an object that is a file or device may have an associated read or write operation that is tested for performance, or an object that is a directory may have an associated file create or file delete operation that is tested for performance.

The method returns (at 1265) the benchmark scores/measurements taken at step 1250. In some embodiments, the method returns the benchmark scores to the benchmark program. The method then sets (at 1270) the "not applicable" flag to equal 0 to indicate that the target collection contains at least one corresponding benchmarkable object for the assigned scenario function.

The method then determines (at 1225) whether there are more objects in the target collection to be processed. If so, the method selects (at 1215) a next current object in the collection for processing. If not, the method determines (at 1280) whether the "not applicable" flag is equal to 1 (indicating that the target collection contains no corresponding benchmarkable objects for the assigned scenario function). If so, the method returns (at 1285) a "not applicable" notice and the method ends. In some embodiments, the method returns the "not applicable" notice to the benchmark program. If the "not applicable" flag is not equal to 1, the method ends.

Figure 13:
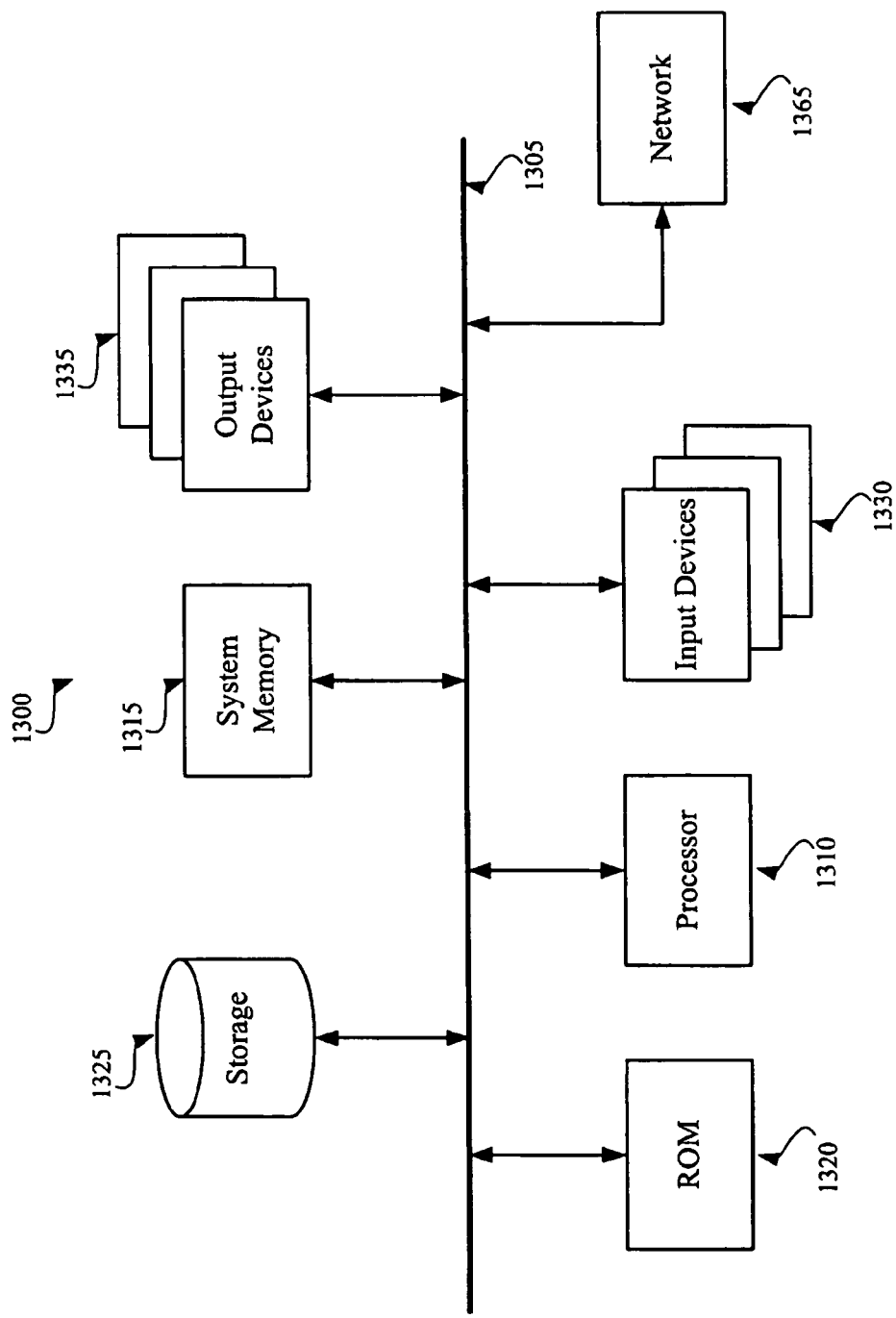
FIG. 13 illustrates a computer system with which some embodiments of the invention are implemented.

FIG. 13 presents a computer system 1300 with which some embodiments of the invention are implemented. The computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325.

The read-only-memory (ROM) 1320 stores static data and instructions that are needed by the processor 1310 and other modules of the computer system. The permanent storage device 1325, on the other hand, is read-and-write memory device. This device is a non-volatile memory unit that stores instruction and data even when the computer system 1300 is off. Some embodiments of the invention use a mass-storage device (such as a magnetic or optical disk and its corresponding disk drive) as the permanent storage device 1325. Other embodiments use a removable storage device (such as a floppy disk or Zip® disk, and its corresponding disk drive) as the permanent storage device.

Like the permanent storage device 1325, the system memory 1315 is a read-and-write memory device. However, unlike storage device 1325, the system memory is a volatile read-and-write memory, such as a random access memory (RAM). The system memory stores some of the instructions and data that the processor needs at runtime.

In some embodiments, instructions and/or data needed to perform methods of the present invention are stored in the system memory 1315, the permanent storage device 1325, the read-only memory 1320, or any combination of the three. For example, the various memory units may contain instructions and/or data of a benchmark program, a scenario function, a resource file, a data file, etc. From these various memory units, the processor 1310 retrieves instructions to execute and data to process in order to execute the processes of the present invention.

The bus 1305 also connects to the input and output devices 1330 and 1335. The input devices 1330 enable a user to communicate information and select commands to the computer system 1300. The input devices 1330 include alphanumeric keyboards and cursor-controllers. The output devices 1335 display images generated by the computer system 1300. For instance, these devices display a user interface (e.g., graphical user interface) through which a user can interface with the computer system 1300. The output devices include printers and display devices, such as cathode ray tubes (CRT) or liquid crystal displays (LCD).

Finally, as shown in FIG. 13, the bus 1305 also couples the computer system 1300 to a network 1365 through, for example, a network adapter (not shown). In this manner, the computer system 1300 can be a part of a network of computers (such as a local area network ("LAN"), a wide area network ("WAN"), or an Intranet) or a network of networks (such as the Internet). Any or all of the components of the computer system 1300 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, some embodiments have been described with reference to a web browser but the graphical user interface teachings of the present invention may be used in any application. One of ordinary skill in the art would understand that the invention is not to be limited by the foregoing illustrative details, but rather is to be defined by the appended claims.

I claim:

1. A method for benchmarking a plurality of views of a window to obtain computing performance measurements, the window having an associated view hierarchy comprising the views of the window in parent and child relationships, each view associated with a set of operations for altering a state of the window, the method comprising:
    analyzing the view hierarchy of the window;
    based on the view hierarchy analysis, selecting a plurality of views of the window for benchmarking;
    for each particular view of the plurality of selected views of the window:
        altering the state of the window by performing at least one operation from the set of operations associated with the particular view; and
        obtaining a computing performance measurement based on a time required to alter the state of the window, wherein the selecting, altering, obtaining, and benchmarking are performed automatically at a computer.

2. The method of claim 1, wherein the benchmarking comprises:
    performing one or more operations associated with the particular view; and
    measuring a time required to complete the performance of the one or more associated operations.

3. The method of claim 1, wherein a view of the window identifies a particular region of the window.

4. A method for benchmarking a plurality of views of a window to a obtain computing performance measurement, the window having an associated view list comprising the views of the window, each view in the view list dividing the window by functionality and associated with a set of operations for altering a state of the window, the method comprising:
    selecting a plurality of views from the view list of the window for benchmarking;
    for each particular view of the plurality of selected views of the window:
        altering the state of the window by performing at least one operation from the set of operations associated with the particular view; and
        obtaining a computing performance measurement based on a time required to alter the state of the window, wherein the selecting, altering, obtaining, and benchmarking are performed automatically at a computer.

5. The method of claim 4, further comprising, before selecting the plurality of views from the view list, processing a resource file that defines views of the window to create the window.

6. The method of claim 5, wherein the resource file is a data file.

7. The method of claim 6, wherein the resource file is a NIB file.

8. A non-transitory computer readable storage medium storing a computer program for benchmarking a computing performance of a window of an application running in a graphical user interface, the window having an associated view hierarchy comprising views of the window in parent and child relationships, the computer program comprising sets of instructions for:
    analyzing the view hierarchy of the window;
    based on the view hierarchy analysis, selecting a set of views of the window for benchmarking, each view describing a particular region of the window and associated with a set of operations;
    altering a state of the window based on the set of operations performed by each selected view; and
    obtaining a computing performance measurement based on a time required to alter the state of the window.

9. The non-transitory computer readable storage medium of claim 8, wherein the set of instructions for altering the state of the window comprises a set of instructions for performing a set of predefined functions for each identified view.

10. The non-transitory computer readable storage medium of claim 9, wherein the predefined operations are generic functions configured to benchmark the views of the window regardless of the contents of each view.

11. The non-transitory computer readable storage medium of claim 8, wherein a highest view in the view hierarchy represents an entire view of the window.

12. A non-transitory computer readable storage medium storing a computer program for benchmarking a computing performance of a window of an application running in a graphical user interface, the computer program comprising sets of instructions for:

analyzing contents of the window to identify a plurality of views, each view describing a particular region of the window and associated with a set of operations;

identifying, from the plurality of views, a set of related views for altering states of the window;

altering a state of the window based on the set of operations performed by each identified related view; and obtaining a computing performance measurement based on a time required to alter the state of the window.

13. The non-transitory computer readable storage medium of claim 12, wherein the set of instructions for altering the state of the window comprises a set of instructions for performing a set of predefined functions for each identified view.

14. The non-transitory computer readable storage medium of claim 13, wherein the predefined operations are generic functions configured to benchmark the views of the window regardless of the contents of each view.

15. The non-transitory computer readable storage medium of claim 12, wherein the set of views are represented in an object oriented language, wherein a particular view identifies a class for specifying an associated operation.

* * * * *